3,646,111
Patented Feb. 29, 1972

3,646,111
PROCESS FOR THE MANUFACTURE OF PHENYL ESTERS AND PHENOL FROM BENZENE
Lothar Hörnig and Hans-Jürgen Arpe, Frankfurt am Main, and Manfred Boldt, Fischbach, Taunus, Germany, assignors to Farbwerke Hoechst Aktiengesellschaft vormals Meister Lucius & Bruning, Frankfurt am Main, Germany
No Drawing. Filed Aug. 8, 1968, Ser. No. 751,020
Claims priority, application Germany, Aug. 25, 1967, F 53,330
Int. Cl. C07c 37/00, 51/32
U.S. Cl. 260—479 R     9 Claims

ABSTRACT OF THE DISCLOSURE

The invention provides a process for the catalytic preparation of phenyl esters and, if desired, phenol, from benzene and saturated aliphatic carboxylic acids in the presence of a catalyst comprising a noble metal of Subgroup VIII of the Periodic Table and metals of main Group V or VI of the Periodic Table, the atomic number of which latter metals is at least 34.

---

The present invention relates to an improved process for the manufacture of phenyl esters and, if desired, phenol from benzene.

U.S. patent application Ser. No. 627,679 discloses a process for the manufacture of phenyl esters and, if desired, phenol from benzene which comprises reacting a mixture of benzene, a saturated aliphatic carboxylic acid and molecular oxygen in the presence of at least one noble metal of sub-Group VIII of the Mendeleeff Periodic Table, the stable valency of which metal in its compounds is at most 4.

It has now been found that the activity of the noble metal catalyst in this process and therewith the yields of phenyl ester or phenol can be improved by adding to the noble metal of sub-Group VIII of the Periodic Table at least one element of main Group V or VI of the Periodic Table, the atomic number of which element is at least 34.

In the following description a noble metal of Subgroup VIII of the Periodic Table is referred to as "noble metal" whereas an element of main Group V or VI of the Periodic Table has the designation "promotor metal."

In the process of the invention preferred promotor metals are the elements antimony and bismuth, as well as selenium and tellurium or mixtures thereof. Especially good results are obtained with bismuth or selenium as promotor metals.

The promotor metals are preferably used in an amount of up to 60 atom percent, calculated on the noble metal. The catalyst has an especially high activity and selectivity when it contains 20 to 40 atom percent of the promotor metal, calculated on the noble metal.

Suitable noble metals are rhodium, iridium, platinum, ruthenium and advantageously palladium.

The metal mixture can be used either alone or advantageously supported in as fine a distribution as possible on a carrier material, such as aluminum oxide, aluminum silicate, silica gel, active carbon, zeolites, pumice, clays, or feldspars. The preferred proportions by weight of noble metal to carrier material may vary within wide limits. The concentration of the noble metal may amount to 0.1 to 10% by weight, or 0.05 to 0.1% by weight or above 10% by weight, calculated on the total weight of the system consisting of carrier material and catalyst. Depending on the nature of the carrier material and its surface properties the total concentration should amount to 0.1 to 10% by weight of a noble metal of Subgroup VII of the Periodic Table, calculated on the total weight of catalyst plus carrier, and 20 to 40 atom percent of a metal of main Group V or VI of the Periodic Table, calculated on the noble metal, so that an optimum coating of the carrier metal is obtained.

To obtain as homogeneous as possible a distribution between noble metal and promotor metal the catalyst is advantageously prepared by reduction of a solution containing reducible compounds of the noble metal and of the promotor metal. Suitable solutions are, for example, aqueous solutions containing simultaneously noble metal chlorides or nitrates and chlorides or nitrates of the promotor metals. It is likewise possible, of course to use appropriate soluble salts of these metals with other acids.

For the production of the metals or metal mixture from their salts various reduction methods may be used. It is possible, for example, to reduce in the liquid phase or in the gaseous phase with inorganic substances such as sodium boron hydride, hydrazine hydrate, hydrogen, or with organic substances such as ethylene, methanol or ethanol. The salt mixture can be reduced to the metal either directly or after having been transformed into other readily reducible compounds, such as oxides, hydroxides or hydrated oxides.

The catalyst system comprising the noble metal and promotor metal may additionally contain as activator alkali metal or alkaline earth metal salts of organic acids, or alkali metal or alkaline earth metal carbonates, preferably salts of strong bases with weak acids, and more preferably an alkali metal salt of the carboxylic acid to be used, or salts forming a buffer system with the said acid, for example sodium phosphates or borax. Depending on the promoter metal used, the addition of an alkali metal sulfate may also lead to a higher yield. The amount of activator, calculated on the mixture of benzene and carboxylic acid in the liquid phase in dependence on the solubility of the activator may vary between 5 and 30% by weight, preferably 10 and 20% by weight. In the gaseous phase the amount of activator may vary within wide limits. Especially good results are obtained with alkali metal acetates which are used in an amount of from 0.1 to 5% by weight, preferably 1 to 3% by weight, calculated on the carrier material.

The carboxylic acids used should contain at most 1% of water or be used in admixture with their anhydrides. When glacial acetic acid is used as starting material it proved advantageous to add up to 30% by weight of acetic anhydride, preferably 10 to 15% by weight, whereby the yield is improved.

The reactants can be mixed within wide limits, i.e. they can be used in equimolecular amounts, or in an excess amount, or in an amount below equimolecular. As regards the proportion of benzene to oxygen, the limits of explosion must be taken into consideration. Temperatures and pressures are not critical. It is suitable to carry out the reaction at a temperature in the range of from 50 to 300° C., preferably 100 to 250° C. and under a pressure ranging from 1 to 50 atmospheres, preferably 1 to 10 atmospheres. It is likewise possible, however, to operate under subatmospheric or atmospheric pressure. The reaction temperature can be varied, depending on the kind of carboxylic acid used and the proportion of benzene to carboxylic acid, and also under the influence of other conditions, such as pressure or decomposition temperature of the formed phenyl ester (hydrolysis). It is expedient to operate in the liquid phase at a temperature in the range of from 75 to 150° C., preferably not below 90° C. The upper temperature limit depends on the pressure applied. When benzene and acetic acid are reacted at atmospheric pressure in a proportion by weight of 1:4 the temperature ranges from 95 to 100° C., but under a higher pressure it may be shifted to higher values. In the gaseous phase the reaction is preferably carried out at a temperature in the range of from 130 to 300° C., more preferably 150 to 250° C.

The reaction mixture obtained is worked up according to known methods. In the liquid phase process the catalyst is separated from the reaction mixture and again contacted with fresh starting components. When the reaction is carried out in the gaseous or vaporous phase, the condensed starting and reaction products are separated, the phenyl ester and the phenol, if any are separated by distillation and the starting components are reconditioned into the reaction.

When, after repeated use, the reactivity of the catalyst has diminished, it may be reactivated by impregnation with corresponding amounts of noble metal and promotor metal salts and reduction thereof to the free metals.

The following examples serve to illustrate the invention but they are not intended to limit it thereto.

EXAMPLES 1 TO 6

A catalyst was prepared by reducing an aqueous-ethanolic suspension of palladium chloride and the chloride of the respective promotor metal with an excess of, for example, 10% of sodium boron hydride first at 40° C. and then at 80 to 90° C. and then isolating the mixture of the reduced metals.

A solution of 20 grams of benzene, 80 grams of acetic acid and 9.6 grams of potassium acetate or a mixture of potassium acetate with another potassium salt was heated with reflux (96 to 98° C.) together with the finely divided catalyst consisting of 2.16 grams of palladium and 10 or 20 atoms percent of the respective promotor metal, while stirring and passing through 2.5 liters per hour of oxygen.

After a reaction period of 5 hours the catalyst was filtered off and, in dependence on the promotor metal used, different amounts of phenyl acetate were separated from the unreacted benzene-acetic acid mixture by distillation as results from the following Table I.

TABLE I

| Ex. | Promoter metal, atom percent | Yield of phenyl acetate (g./5 hrs.) | Activator |
|---|---|---|---|
| 1 | | 0.15 | 9.6 grams $KC_2H_3O_2$. |
| 2 | 10% Te | 0.42 | Do. |
| 3 | 10% Bi | 0.77 | Do. |
| 4 | 10% Bi | 0.88 | 6.2 grams $KC_2H_3O_2$ plus 3.4 grams $KHSO_4$. |
| 5 | 10% Bi | 0.55 | 6.2 grams $KC_2H_3O_2$ plus 3.4 grams $KH_2PO_4$. |
| 6 | 20% Bi | 1.53 | 9.6 grams $KC_2H_3O_2$. |

NOTE.—Besides $CO_2$ no by-products were formed.

EXAMPLES 7–10

20 grams of silica gel (particle size 0.075 to 0.25 mm.) were impregnated with a solution of 4.75 grams of palladium acetate and varying amounts (for example 10 atoms percent=0.985 gram) of bismuth nitrate. $5H_2O$ in 22 milliliters of semiconcentrated nitric acid, while stirring, the mixture was dried on the steam bath and after-dried in a heatable reaction tube at 200 to 220° C. while passing through about 5 liters per hour of nitrogen. The nitrogen was then saturated with methanol at room temperature and with the mixture obtained the impregnated carrier was treated, first for one hour at 220–220° C., then for a further hour at 400–450° C. After this treatment, the reduced catalyst was contacted at a temperature from 97 to 100° C., while vigorously stirring, with a solution of 80 grams of acetic acid, 20 grams of benzene and 9.56 grams of potassium acetate, while passing through 2.5 liters of oxygen per hour.

In Table II are indicated the results of Examples 7 to 10 obtained with increasing amounts of bismuth as promotor metal.

TABLE II

| | | | Phenyl acetate | |
|---|---|---|---|---|
| Example | Promoter metal, atom percent | Period of reaction, hrs. | Yield in grams | Space/time yield, g./l. cat./hr. |
| 7 | 10% Bi | 10 | 1.64 | 3.0 |
| 8 | 20% Bi | 10 | 1.97 | 3.7 |
| 9 | 30% Bi | 15 | 2.30 | 4.3 |
| 10 | 50% Bi | 10 | 1.75 | 3.2 |

As by-products there were obtained, for example in Example 9, 0.01 gram of phenol and 0.8 gram of $CO_2$. The reaction mixture was worked up by filtration of the catalyst and distillative separation of the reaction products phenyl acetate and phenol from the unreacted acetic acid/benzene mixture. The catalyst separated by filtration could be used for another reaction.

What is claimed is

1. In a process for the catalytic production of phenyl esters and, if desired, phenol from benzene by reacting a mixture of benzene, a saturated carboxylic acid and molecular oxygen in the presence of a metal selected from the group consisting of rhodium, iridium, platinum, ruthenium and palladium, the improvement which comprises using a catalyst system containing in addition bismuth or tellurium.

2. The process of claim 1, wherein bismuth or tellurium are used in an amount of at most 60 atom percent, calculated on the noble metal.

3. The process of claim 1 wherein bismuth or tellurium are used in an amount of from 20 to 40 atom percent, calculated on the noble metal.

4. The process of claim 1, wherein the noble metals are used in an amount of from 0.1 to 10% by weight, calculated on the carrier material.

5. The process of claim 1, wherein as activator, alkali metal salts of organic acids are added in an amount of 5 to 30% by weight, calculated on the mixture of benzene and carboxylic acid.

6. The process of claim 1, wherein the reaction is carried out at a temperature in the range of from 75 to 150° C. and under a pressure of from 1 to 10 atmospheres.

7. The process of claim 1 wherein the catalyst is supported on an inert carrier material such as aluminum oxide, aluminum silicate, pumice, carbon, zeolites or clays in finely divided form.

8. The process of claim 1, wherein the saturated carboxylic acid used contains less than 1% of water.

9. The process of claim 1, wherein up to 30% by weight of its anhydride are added to the carboxylic acid to be reacted.

No references cited.

JAMES A. PATTEN, Primary Examiner

U.S. Cl. X.R.

260—621 R